Sept. 3, 1929. T. F. BAILY 1,727,192
ANNEALING EQUIPMENT AND METHOD
Filed Aug. 20, 1926 3 Sheets-Sheet 2

Inventor
Thaddeus F. Baily.
By Frease and Bond
Attorneys

Sept. 3, 1929.  T. F. BAILY  1,727,192
ANNEALING EQUIPMENT AND METHOD
Filed Aug. 20, 1926  3 Sheets-Sheet 3

Inventor
Thaddeus F. Baily.
By Frease and Bond
Attorneys

Patented Sept. 3, 1929.

1,727,192

UNITED STATES PATENT OFFICE.

THADDEUS F. BAILY, OF ALLIANCE, OHIO.

ANNEALING EQUIPMENT AND METHOD.

Application filed August 20, 1926. Serial No. 130,521.

This invention relates to the circulating of heating and cooling gases through annealing hoods and the like and more particularly to the annealing of metal articles.

The objects of the improvement are to provide means whereby gas is circulated through heating or cooling chambers extraneous to the annealing hood and then through the annealing hood containing the material under treatment, thereby controlling the temperature of the material and the rate of heating and cooling; means being provided for regulating the flow of the heated and cooled gases through the hood.

A further object of the improvement is to provide an efficient annealing hood and the like adapted to be quickly brought to the desired temperature, the same comprising an inner shell of high heat resisting metal, a spaced outer shell of steel or the like and a filler of silocel or other suitable heat insulating material being provided between the inner and outer shells.

Another object of the improvement is to provide a fan for circulating the heated gases, the impeller of said fan and the inner casing being formed of high heat resisting metal, whereby the impeller will resist the strains induced by the centrifugal action of the fan; and provided with a shaft of the same material extended through a heat insulated wall in the duct leading from the heating chamber to the hood; said duct being preferably made with an inner surface of heat resisting metal and provided on the outside with a heat insulating material.

Another object of the invention is to provide a plurality of hoods particularly adapted to slowly heat, soak and cool and arranged in a series so that only one hood is heating at any one time, thus enabling the heating means to be operated in its most economical manner both as to even power load and to prevent idle capacity.

The advantages of this type of equipment over the usual equipment for annealing similar materials are, the close control of the heating, soaking and cooling cycle, since the direct heating medium is a reducing or non-oxidizing gas passing directly in and around the material to be annealed, the material being heated not by radiation only, as in the case of all other electric furnaces; secondly, simplicity of handling the material, as in the type of equipment disclosed the material may be placed in racks and by means of a crane placed upon the heating pedestal and the hood or cover placed over the pack and pedestal by means of the crane.

Figure 1:
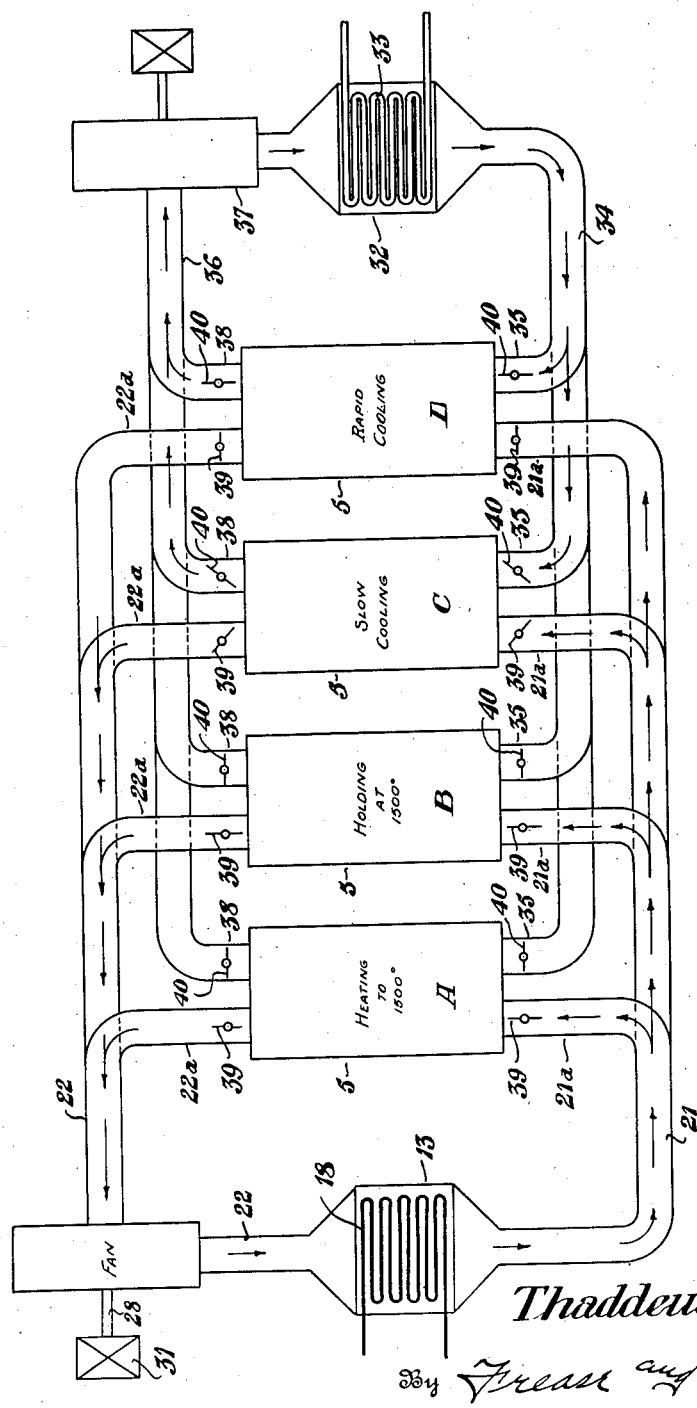
Figure 2:
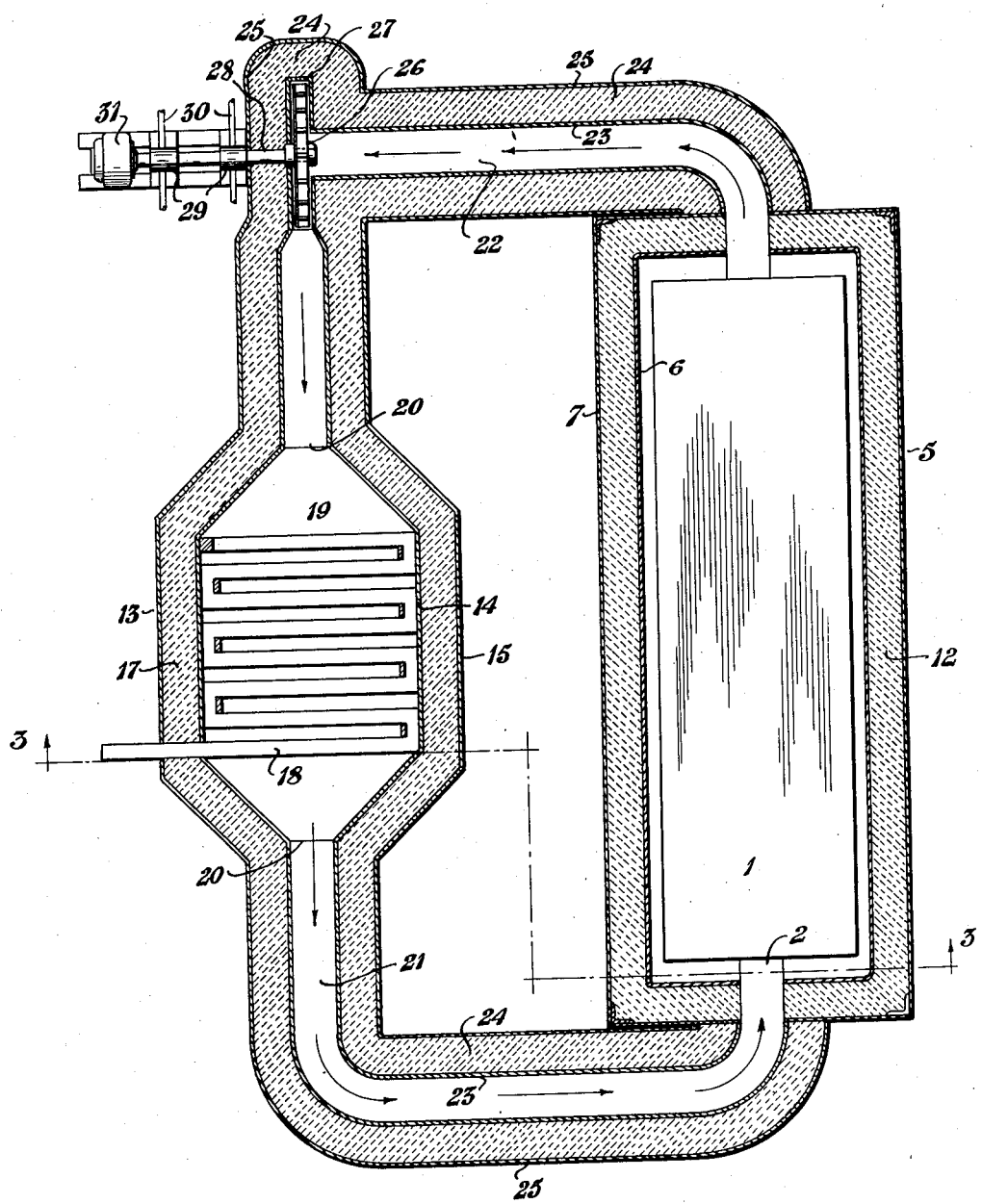
Figure 3:
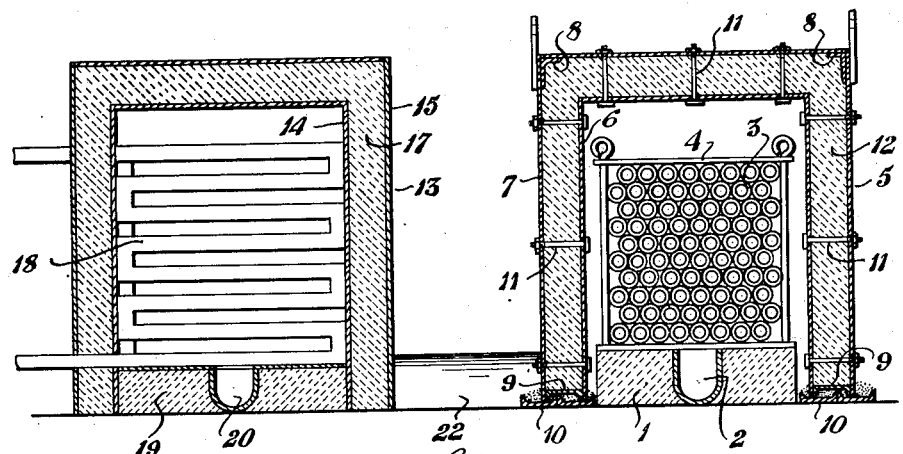
Figure 4:
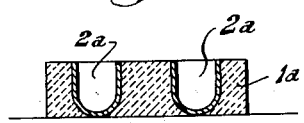
Figure 5:
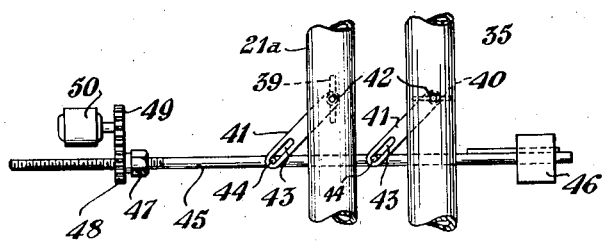

An embodiment of the invention is illustrated in the accompanying drawings, in which Figure 1 is a diagrammatic plan view showing a plurality of annealing hoods connected with the heating and cooling means;

Fig. 2, a plan sectional view of a single hood showing the connection of the same to the heating means;

Fig. 3, a transverse sectional view taken substantially on the line 3—3, Fig. 2;

Fig. 4, a transverse sectional view through one of the pedestals designed for use in connection with both heating and cooling means, and Fig. 5, a diagrammatic view of the damper control mechanism for one hood.

Similar numerals refer to similar parts throughout the drawings.

The material supporting pedestal 1 or 1ª is arranged to be permanently located in any suitable position upon the floor and may be provided with a single channel 2 in the event it is to be connected only to the heating means, or with a pair of spaced channels 2ª if it is to be connected with the heating and cooling means both.

The invention is capable of many different uses but is especially applicable to the annealing of tubes, bars and the like which require soaking at high temperatures for considerable periods and slow cooling.

In the accompanying drawings the invention is illustrated as applied to the annealing of tubes 3 which may be formed into a pack, within a cradle or rack 4 and lowered upon the pedestal by means of a crane or the like.

The hoods, indicated generally at 5, are then lowered by the crane and placed over the pedestals and packs as best illustrated in Fig. 3. Each of these hoods preferably comprises an inner shell or lining 6 of high heat resisting metal such as chromium, and a spaced outer shell or casing 7 which may be heavy sheets or plates of steel.

The inner and outer shells are connected in spaced relation by means of the angles 8, channels 9 which enter the sand troughs 10, forming a sand seal, around the hood, and the bolts 11, suitable heat insulating material, such as silocel or the like, being interposed between the shells as shown at 12. This construction of hood permits a rapid heating up and at the same time prevents heat loss through the walls thereof.

The heating chamber 13 may be permanently located adjacent to the pedestal and is preferably constructed in the same manner as the hood, comprising the inner shell 14 of high heat resisting metal, the spaced outer shell 15 of any suitable material, and the packing 17 of insulating material between the shells.

Heat is preferably furnished to the heating chamber by means of the electric resistance element 18. The bottom wall 19 of the heating chamber is provided at opposite ends with the channels 20 which communicate with ducts 21 and 22 leading to opposite ends of the pedestal and communicating with the channels 2 therein.

These ducts are also preferably formed in the same manner as the hood and heating chamber, having the inner lining 23 of high heat resisting metal, surrounded by the heat insulating material 24, and preferably covered by a casing 25, which may be of any suitable material.

For the purpose of circulating a reducing or non-oxidizing gas through the heating chamber and hood, in a continuous closed circuit, a fan may be located in the duct 22, the impeller 26 thereof being formed of chromium or other high heat resisting metal as well as the casing 27 and shaft 28. This shaft extends through the heat insulating material 24, surrounding the casing, and is journaled, upon the outside of the casing, in bearings 29, which may be water cooled, as indicated by the pipes 30, a motor 31 being provided for driving the fan.

By forming the fan of this heat resisting metal the impeller will be able to resist the centrifugal action of the fan, at high temperature, while the heat loss through the shaft will be very slight, and thus the journal portion of the shaft will not overheat and may be easily cooled by the water cooling pipes.

In Fig. 1 is illustrated an application of the invention to a plurality of hoods in which the material may be passed through various stages of the heating, soaking and cooling periods, in different hoods, all controlled from the same heating and cooling means.

The duct 21, from the heating chamber, may be provided with a plurality of branch ducts 21ª, leading to the plurality of hoods, which for the purpose of illustration are indicated at A, B, C and D.

The duct 22, which leads to the fan and thence to the heating chamber, is provided with a plurality of branch ducts 22ª connected to the several hoods.

A cooling chamber 32, provided with cooling coils 33 through which cold water or the like is passed, may be located upon the opposite side of the hoods from the heating chamber and is provided with a duct 34, communicating with the branch ducts 35, leading to one end of each hood, and with the duct 36, communicating with the other side of the cooling chamber, through the fan casing 37, and provided with a plurality of branch ducts 38, communicating with the opposite ends of the hoods.

A damper 39 is provided in each branch duct 21ª and 22ª of the heating system and a similar damper 40, located at a 90 degree angle thereto and arranged to be moved in coordination therewith, is located in each branch duct 35 and 38 of the cooling system.

In order to coordinate the movement of each pair of dampers 39 and 40 a mechanism such as illustrated in Fig. 5 may be provided. A rocker arm 41 is fixed upon the shaft 42 of each damper and provided, at its free end, with an elongated slot 43 engaging a pin 44 upon the screw shaft 45.

This shaft is mounted for longitudinal movement through the guide 46 and rotatable nut 47, being held against rotation in any suitable manner.

The nut 47 is mounted for rotation, being held against longitudinal movement in any suitable manner, and has fixed thereto a pinion 48 which may be driven, as by the pinion 49 upon the shaft of the motor 50.

With this construction, when one of the dampers of each pair is fully opened the other is fully closed and as the mechanism is operated the open damper is moved toward closed position and the closed damper toward open position until they reach a position such as shown in the ducts leading to the hood C where each damper is half-way open. Further movement of the mechanism will bring the dampers to the position shown in the hood D, where the open damper has assumed the entirely closed position while the closed damper has assumed the entirely open position.

This provides for a control of the volume of gas passing from either the heating or cooling system through any one of the hoods and thus provides for control of the temperature of any desired hood, permitting the material in any hood to be brought to the desired temperature within the required period of time, held or soaked at this temperature for the required time and then cooled either slowly or rapidly as desired, all in a reducing or nonoxidizing atmosphere and without handling or charging of the material from the time it starts to heat until it is fully cooled.

I claim:

1. A series of hoods of the character described and a system of heating consisting of an extraneously heated chamber and a cooling system consisting of an extraneously cooled chamber and means for controlling the amount of gases within the hoods flowing from each chamber through each hood.

2. An annealing apparatus comprising a plurality of hoods, a heating chamber extraneous to the hoods, a cooling chamber extraneous to the hoods, a duct connecting each hood with the heating chamber in a closed circuit, a duct connecting each hood with the cooling chamber in a closed circuit, means for circulating a gas through each duct and means for independently controlling the flow of gas from any duct through any of the hoods.

3. An annealing apparatus comprising a plurality of hoods, a heating chamber extraneous to the hoods, a cooling chamber extraneous to the hoods, a duct connecting each hood with the heating chamber in a closed circuit, a duct connecting each hood with the cooling chamber in a closed circuit, means for circulating a gas through each duct and means for independently controlling the flow of gas from any duct through any of the hoods, the position of the means controlling said flow of gas being in spaced relationship with each other.

4. An annealing apparatus comprising a plurality of hoods, a heating chamber extraneous to the hoods, a cooling chamber extraneous to the hoods, a duct connecting each hood with the heating chamber in a closed circuit, a duct connecting each hood with the cooling chamber in a closed circuit, means for circulating a gas through each duct and means for independently controlling the flow of gas from any duct through any of the hoods, said control device for said ducts being arranged to operate in coordination with each other.

In testimony that I claim the above, I have hereunto subscribed my name.

THADDEUS F. BAILY.